Sept. 23, 1969 H. BEYERSDORF ET AL 3,469,134
ELECTRICAL MACHINES
Filed July 29, 1966 4 Sheets-Sheet 1

Inventors:
Hartwig Beyersdorf
Gerhard Bering
BY Spencer & Kaye
Attorneys

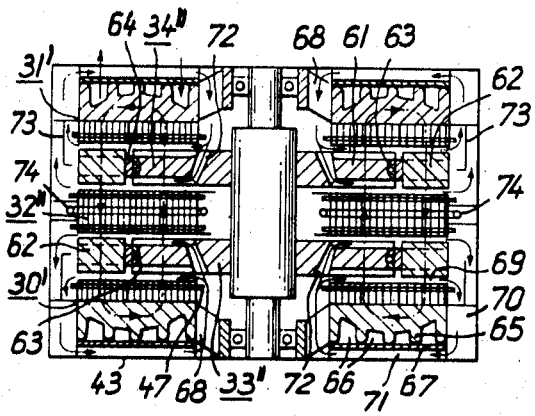
Fig. 9
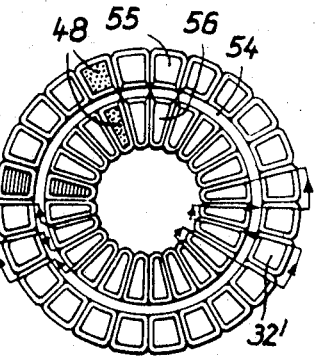
Fig. 7
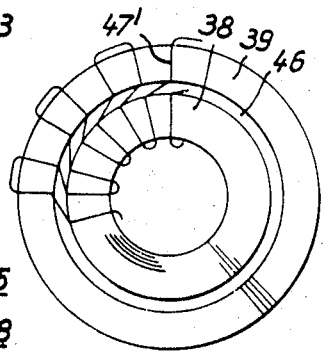
Fig. 4
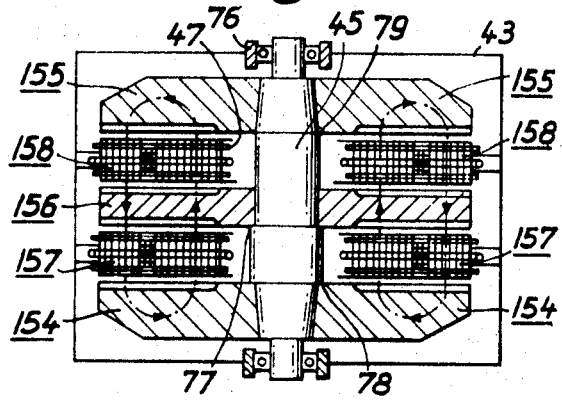
Fig. 10
Fig. 11
Inventors:
Hartwig Beyersdorf
Gerhard Bering
BY Spencer & Kaye
Attorneys

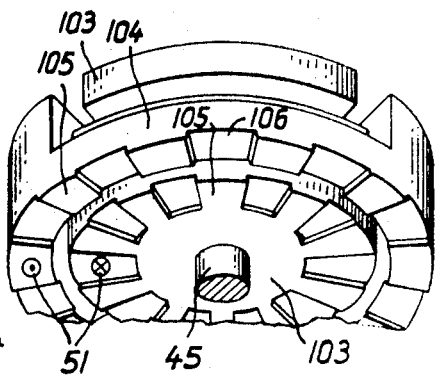
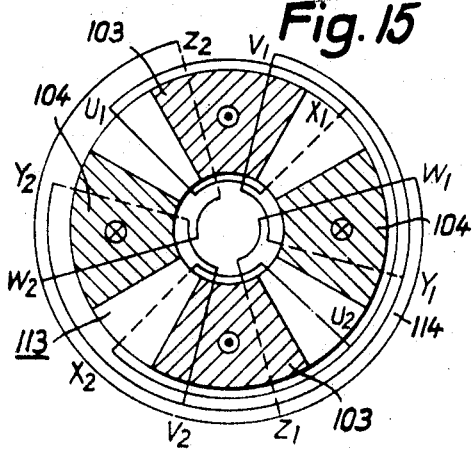
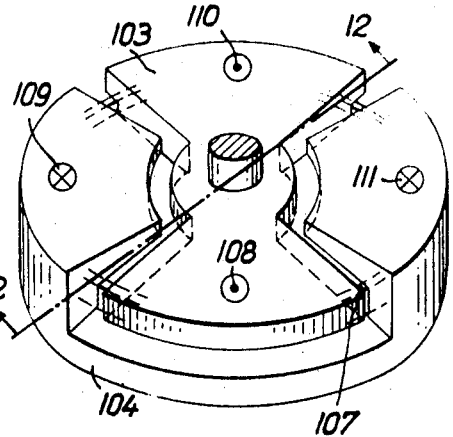
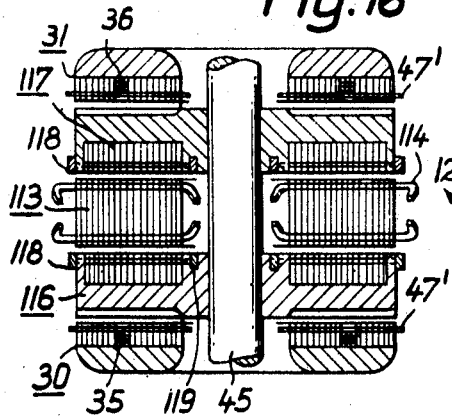

United States Patent Office

3,469,134
Patented Sept. 23, 1969

---

3,469,134
ELECTRICAL MACHINES
Hartwig Beyersdorf, Bremen-Arbergen, and Gerhard Bering, Bremen, Germany, assignors to Lloyd Dynamowerke G.m.b.H., Bremen, Germany
Filed July 29, 1966, Ser. No. 568,857
Claims priority, application Germany, July 31, 1965,
L 40,177, L 51,276
Int. Cl. H02k 3/04
U.S. Cl. 310—164  10 Claims

ABSTRACT OF THE DISCLOSURE

A rotary electrical machine composed of stator elements and rotor elements each of which is constructed in the form of a disc and which are arranged with respect to one another to form a plurality of air gaps each of which extends axially between a stator element and an adjacent rotor element, the machine including a homopolar excitation winding, an A.C. winding formed of a plurality of radial conductors, and means composed of a plurality of radially extending slots and teeth for causing one air gap to have a reluctance which varies cyclically around the circumference of the machine, the means composed of slots and teeth being disposed on an element which is rotatable with respect to the element carrying the A.C. winding. The excitation winding is arranged to produce an axially extending flux field which flows in one direction through one radial portion of each A.C. winding and in the opposite axial direction through the other portion of each such winding, whereby the flux field extending through the air gap whose reluctance varies cyclically permits a motor or generator relationship to be established between the current flowing through the A.C. winding and the rotation existing between the element carrying the A.C. winding and the element in which the slots and teeth are provided.

---

The present invention relates to the field of electrical machines, and more particularly to rotary machines having a stator and a rotor.

Presently existing rotating machines, such as motors, generators and converters, are almost invariably constructed in cylindrical form, i.e., with one component being disposed concentrically around the other component and being radially separated therefrom by a concentric annular air gap. This form of construction places an inherent limitation on the percentage of the stator and rotor bodies, which are generally made of iron or steel, through which magnetic flux can be made to flow during operation. This is due primarily to the fact that the cross section of the axially-extending teeth on the rotor and/or stator, and the maximum tooth induction determined thereby, restricts a greater utilization of the remainder of the stator and the rotor bodies, and also to the fact that the magnetic return paths through these bodies are relatively long.

On the other hand, a class of electromagnetic devices, as exemplified by electromagnetic slip clutches, is known wherein the two mutually rotatable members are constructed in the form of discs which are axially spaced from one another.

It has been found that this latter form of construction can be advantageously applied to electrical machines of the type previously described so as to produce a more effective utilization of the bodies from which the two members are formed. However, a truly efficient utilization of devices constructed in this form has been heretofore hampered because of the problems created by the occurrence of attractive forces between the stator and the rotor during operation. This is particularly true of machines designed to operate at high power levels. It has also been found that separate devices for compensating these forces are extremely expensive. In addition, development of these devices has been held back by serious winding problems.

It has recently been suggested to minimize these drawbacks, and hence to improve the operation of such machines, by constituting either the stator or rotor, both of which have a disc-shaped construction, of two structurally separate partial disc portions which are axially spaced from one another and which are disposed on respective opposite sides of the other member, i.e., the member which is not divided into two partial disc portions. This form of construction has been found to lead to a marked increase in the amount of active iron utilized for the magnetic circuits and to a considerable reduction in the weight and spaced requirements of the machine. Such a form of construction can be applied equally well to the production of D.C. machines, synchronous machines, or asynchronous machines. A plurality of ancillary modifications have also been suggested for the purpose of structurally and electrically improving such devices and for rendering them capable of a wide variety of uses.

It is a primary object of the present invention to provide further improvements in such devices.

A further object of the present invention is to improve the efficiency of such devices.

A more specific object of the present invention is to provide a further improvement in the energy conversion efficiency of such devices.

Another specific object of the present invention is to provide novel forms of construction which permit a more efficient utilization of the iron constituting the various machine parts and of the space occupied by the machine.

These and other objects according to the present invention are achieved by the provision of a rotary electrical machine having first means defining a stator composed of at least two structurally separate disc portions axially spaced from one another, and second means defining a rotor composed of at least two structurally separate disc portions axially spaced from one another. According to a principal feature of the present invention, one of these means has one more disc portion than the other means, each of the disc portions of the other means being interposed between two successive disc portions of the one means and being axially spaced therefrom to define two air gaps each of which extends between each disc portion of the other means and a respective adjacent disc portion of the one means. In addition, two of the disc portions of the one means constitute end disc portions each of which defines a respective axial extremity of the assembly formed by the stator and the rotor; and the remaining disc portions of the one means and all of the disc portions of the other means constitute interior disc portions disposed between the two end disc portions. The arrangement thus formed by the first and second means defines a magnetic path for the flow of flux at least once in each axial direction through each of the interior disc portions and a magnetic flux return path only through each of the end disc portions.

It has been found that this form of construction can be applied equally well to D.C. machines, synchronous machines, or asynchronous machines, intended for use as motors, generators, or combined motor-generator sets, the latter also being known as converters. For any of these applications, the devices according to the present invention can be arranged so that either group of partial discs functions as the stator or the rotor and so that either one, or both, groups of discs are rotatable.

Devices according to the present invention can be constructed, for example, simply by adding two disc portions to a three-part machine of the type already suggested so as to create a machine having five separate disc portions, three of which constitute one machine part and the remaining two of which constitute the other machine part. It has been found that such a five-part machine can provide, for the same excitation input, double the output of a similar three-part machine.

It should be appreciated at the outset that embodiments of the present invention are not limited to machines having five partial discs since the invention can be applied equally well to the construction of machines having seven or more such discs.

Other objects according to the present invention are achieved by the provision of a rotary electric machine having means defining a stator composed of at least one disc portion and means defining a rotor composed of at least one disc portion mounted for rotation with respect to the stator and axially spaced from the stator disc portion to define an air gap which extends axially between the rotor and the stator. This machine further includes means associated with one of the disc portions for producing axial paths of differing magnetic conductance to flux passing through the air gap. Finally, the machine is provided with homopolar excitation means in the form of at least one circular winding disposed in one of the disc portions. This winding divides the disc portion into an inner member disposed radially inwardly of the winding and an outer member disposed radially outwardly of the winding, these members being dimensioned for reaching the same degree of magnetical saturation when traversed by axially flowing magnetic flux produced by the winding.

Additional objects and advantages of the present invention will become apparent upon consideration of the following description when taken in conjunction with the accompanying drawings in which:

FIGURE 4 is a plan view of a modified form of construction of the element of FIGURE 2.

FIGURE 7 is a plan view of one element of the device of FIGURE 6.

FIGURE 9 is a view similar to that of FIGURE 1 of yet another embodiment of the present invention.

FIGURE 10 is a view similar to that of FIGURE 1 of a further embodiment of the present invention.

FIGURE 11 is a view similar to that of FIGURE 1 of yet another embodiment of the present invention.

FIGURE 13 is a bottom perspective view of one element of the arrangement of FIGURE 12.

FIGURE 14 is a top perspective view of the element of FIGURE 13.

FIGURE 15 is a plan view showing the wiring of one element of FIGURE 12.

FIGURE 16 is a view similar to that of FIGURE 1 of a still further embodiment of the present invention.

Figure 1:
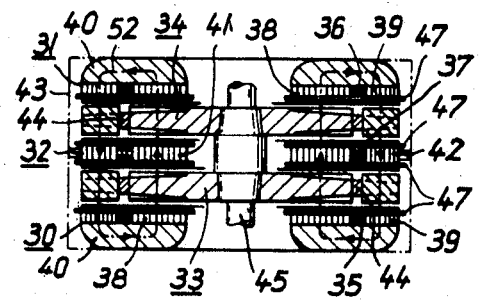
FIGURE 1 is an axial, cross-sectional view of a first embodiment of the present invention.

A first embodiment of the present invention is shown in FIGURE 1 to be constituted by a stator having end partial disc portions 30 and 31 and interior partial disc portion 32, constituting the central disc portion of the machine, and a rotor having interior partial disc portions 33 and 34 mounted for rotation on a shaft 45. This machine is intended primarily for operation as a generator and is provided with three circular homopolar excitation windings 35, 36 and 37, disposed in partial disc portions 30, 31 and 32, respectively.

Partial disc portions 30, 31 and 32 are rigidly mounted in a suitable housing 43 so as to be maintained in proper space relationship with respect to one another. The two end disc portions 30 and 31 are of identical construction and each is constituted by an inner ring member 38 and an outer ring member 39 separated from the inner member 38 by an annular space in which a respective one of the homopolar windings 35 and 36 is disposed. Each of the members 38 and 39 is preferably constituted by a laminated body formed by coiling a plated sheet metal strip in a spiral manner, the strip preferably being made of steel and being plated with a magnetic insulating layer. This form of construction is illustrated in the drawings by vertical hatching lines. The annular space between members 38 and 39 act to prevent the flow of magnetic flux between the two members, the flux thus being constrained to flow in a substantially axial, as opposed to a radial, direction through each of them.

Each end disc portion carries a solid annular body 40 of magnetic material which acts as a return path for the flux passing through the machine. The two annular bodies 40, each of which is disposed at one axial extremity of the machine, define the ends of the flux paths passing through all of the stator disc portions.

The central disc portion 32 of the stator is also composed of an inner ring member 41 and an outer ring member 42 which is separated from the member 41 by an annular space in which the homopolar excitation winding 37 is disposed. Each of the members 41 and 42 is also preferably constituted by a laminated body formed by coiling a plated sheet metal strip in a spiral manner and the annular space between the two members acts to prevent the flow of magnetic flux therebetween.

Disc portions 30, 31 and 32 are preferably dimensioned, with respect to the diameter of their associated excitation winding, so that the inner member of each has the same degree of magnetic saturation as its associated outer member, i.e., the same flux density exists in each member.

The homopolar excitation windings 35, 36 and 37 are supplied with current in a conventional manner by connecting them to an electric battery or other suitable power supply.

The machine rotor is constituted by two disc portions 33 and 34 mounted for rotation with the shaft 45 and each constituted by an inner disc member and an outer ring member. Each of the members of each disc portion 33 and 34 is preferably made of a solid body of magnetic material, and the members are magnetically isolated from one another by a connecting ring 44 made of non-magnetic material.

Figure 2:
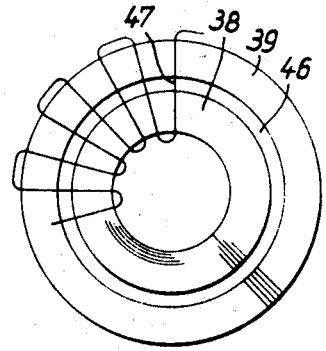
FIGURE 2 is a plan view of one element of the device of FIGURE 1.

The disc portions of the machine stator carry a plurality of A.C. windings 47, one such winding being provided in each of the end disc portions 30 and 31 and two such windings being provided in central disc portion 32. Each of the windings is disposed in a series of radially-extending grooves formed in one end face of its associated stator disc. The manner in which one of the windings 47 is arranged is shown in FIGURE 2, which is a plan view of one of the stator end disc portions of the arrangement of FIGURE 1. This end disc portion, which is composed of ring members 38 and 39 separated from one another by an annular space 46 in which the associated homopolar excitation winding 35 or 36 is disposed, is provided with a lap or wave winding 47 constituted by a plurality of circumferentially distributed, radially-extending conductors each of which extends in a straight line across the space 46.

Figure 3:
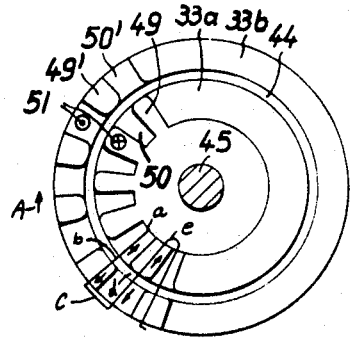
FIGURE 3 is a plan view of another element of the device of FIGURE 1.

When the windings 47 have the form shown in FIGURE 2, each of the rotor disc portions 33 and 34 is preferably constructed in the manner shown in FIGURE 3 to have two bands of radially-extending slots and teeth, the inner band being constituted by teeth 49 and slots 50 and the outer band being constituted by teeth 49′ and slots 50′. The slots and teeth of the outer band are angularly offset with respect to those of the inner band in such a way that each slot 50 is disposed opposite a tooth 49′ and each tooth 49 is disposed opposite a slot 50′. The total number of slots and teeth in each band is preferably made equal to the total number of radial conductors in the associated winding 47. The circular boundary between these two bands is arranged in axial alignment with the homopolar excitation winding disposed in the adjacent stator disc portion. Each of the rotor disc portions 33 and 34 is constructed of two members, FIGURE 3 showing the disc portion 33 having inner member 33a and outer member 33b. These members are separated from one another by the annular non-magnetic ring 44. The flow of flux through the rotor disc portion is indicated by the conventional symbols 51 which indicate that, flux flows in one axial direction through outer member 33b and in the opposite axial direction through inner member 33a. This is also shown by the broken-line arrows 52 in FIGURE 1. The object of providing two angularly offset bands of slots and teeth in the manner shown in FIGURE 3 will be described in detail below.

In another form of construction according to the present invention, the A.C. windings can be arranged in the manner shown for the winding 47′ of FIGURE 4. This winding is composed of a plurality of generally radially-extending conductors each of which has a first portion disposed in one radial groove of its associated stator disc and a second portion disposed in the next succeeding groove, the transition between conductor portions occurring in the region where the conductor traverses the space 46 occupied by an excitation winding.

Figure 5:
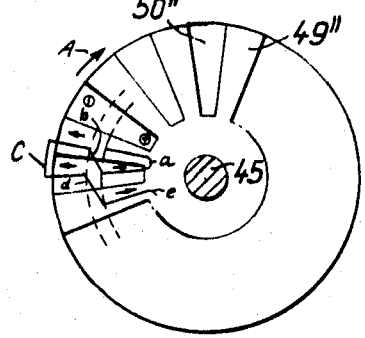
FIGURE 5 is a plan view of a modified form of construction of the element of FIGURE 3.

When one of the A.C. windings of the arrangement of FIGURE 1 has the form shown in FIGURE 4, the end face of the rotor disc portion which faces the A.C. winding is preferably given the form shown in FIGURE 5 in which the two disc portion members are replaced by a single disc of solid material having only one band of teeth 49″ and slots 50″, with the total number of teeth 49″ and slots 50″ being equal to the total number of conductors of winding 47′.

The passage of each conductor of the winding 47′ from one radial groove to the next succeeding radial groove in the embodiment of FIGURE 4, or the provision of two bands of slots and teeth associated with an A.C. winding having straight conductor portions in the embodiment of FIGURES 2 and 3, is necessary in the case of homopolar excitation because the flux produced by excitation windings 35, 36 and 37 flows in one axial direction in the region enclosed by the excitation windings, i.e., the region defined by inner disc members 33a and 38, and in the opposite axial direction in the region which is outside of the excitation windings, i.e., the region occupied by members 33b and 39. Therefore, if one of the above-described arrangements were not used, the voltage induced in one half of each conductor of A.C. winding 47 would cancel out the voltage induced in the other half of the conductor when the rotor is caused to rotate with respect to the stator and when both members 38 and 39 are subjected to the same degree of magnetic saturation.

This undesirable result is avoided due to the fact that, in the embodiment of FIGURES 2 and 3, as well as in the embodiment of FIGURES 4 and 5, each radial conductor of the A.C. winding will always have one portion disposed opposite a rotor disc slot and a second portion disposed opposite a rotor groove tooth, the smaller air gap associated with a tooth producing a higher flux density than the air gap associated with a slot. Therefore, the voltage induced in one direction in the conductor by the presence of a tooth will always be greater than the opposite polarity voltage induced in the other conductor portion by a slot, so that the two opposite polarity voltages will not completely nullify one another.

That arrangements of the type described in connection with FIGURES 1 to 6 will, when functioning as a generator, operate to cause a net A.C. voltage to be induced in each A.C. winding can be best appreciated from a detailed consideration of FIGURES 3 and 5, FIGURE 3 showing two radial conductors of an A.C. winding 47 and FIGURE 5 showing two radial conductors of an A.C. winding 47′. It will be appreciated that the voltages induced in the pair of radial conductors illustrated in each of these figures will also be induced in every other adjacent pair of radial conductors so that an analysis of one such pair of conductors will completely define the effect of the machine on the entire winding. The analysis is identical for both of FIGURES 3 and 5.

It will be assumed that the disc 33 of FIGURE 3 or the corresponding disc of FIGURE 5 is rotating counterclockwise, in the direction of arrow A, with respect to the disc carrying the associated A.C. winding, and that the excitation flux passes in the axial direction in each disc portion as represented by the conventional symbols 51 of FIGURE 3. Under these conditions, and on the basis of Flemings' Generator Rule, also known as the Right-Hand Rule, it can be shown that the voltages induced in the inner radial portions $a$–$b$ and $d$–$e$ will be spatially in the opposite direction from the voltages induced in the outer conductor portions $b$–$c$ and $c$–$d$. The voltage on each conductor portion is indicated by the arrow adjacent that portion.

Moreover, because the conductor portions $a$–$b$ and $c$–$d$ are, at the instant under consideration, disposed opposite a slot, while the portions $b$–$c$ and $d$–$e$ are each opposite a tooth, the reluctance of the air gap region adjacent the first-mentioned pair of conductor portions will be higher than that of the air gap regions adjacent the second-mentioned pair of conductor portions. As a result, the voltages induced in the first-mentioned conductor portions will be smaller than those induced in the second-induced conductor portions, the relative values of the voltages being represented by the lengths of the various arrows.

Because of the manner in which adjacent radial conductors are connected together, it will result that the two larger amplitude voltages existing between the conductor portions $b$–$c$ and $d$–$e$ will be added together. The smaller amplitude voltages between the portions $a$–$b$ and $c$–$d$ will also be added together. Thus, the net voltage induced in the A.C. winding between the points $a$ and $e$ will be equal to the sum of the larger voltages across portions $b$–$c$ and $d$–$e$ minus the sum of the smaller voltages across portions $a$–$b$ and $c$–$d$. In other words, the opposite-polarity voltages induced in the two portions of each radial conductor will not completely cancel one another out.

When the disc carrying the teeths and slots has advanced by an amount equal to its slot-tooth pitch, the amplitude of the voltages induced in the various conductor portions will be interchanged so that the polarity of the net voltage appearing between points $a$ and $e$ will be inverted. Thus, an A.C. voltage is induced in the A.C. winding.

A similar analysis based on the Motor Rule, or Left-

Hand Rule will readily establish the operativeness of machines according to the invention as motors. The waveform of the voltage produced by each A.C. winding can also be controlled by orienting the winding conductors at some angle with respect to radial lines emanating from the motor axis of rotation. In addition, each A.C. winding conductor can be arranged to follow a curved path.

For receiving the conductors of the A.C. windings, the interior end face of each stator end disc portion 30 and 31 is suitably provided with a series of radially-extending grooves or bores.

Stator central disc portion 32 is constructed in a manner which is similar to that of stator disc portions 30 and 31, but with a set of grooves or bores for one A.C. winding 47 in each of its end faces.

The device of FIGURE 1 is thus composed of four air gap systems each of which includes a stator disc end face having an A.C. winding, an air gap, and a rotary disc end face having one or two sets of radially-extending, circumferentially distributed slots and teeth. The device is primarily intended for operation as a generator and operates according to the modulation principle. Since all of the windings of the machine are disposed on the stator disc portions, electrical connections to these windings can be made in a simple manner.

The four A.C. windings 47 may be maintained electrically isolated from one another and each may be individually designed to produce a different voltage, so that the entire generator can be made to supply four different voltage levels. Moreover, each air system may be provided with a different A.C. winding pitch and a correspondingly different number of slots and teeth in order to permit the output voltage from each winding to be at a different frequency. Finally, the slots and teeth on one end face of each rotary disc portion may be angularly offset with respect to the corresponding slots and teeth on the other end face thereof and the two rotary disc portions can be angularly offset with respect to one another by any desired amount during assembly in order to permit the resulting generator to produce four output voltages having any desired relationship between their amplitudes, frequencies and phase angles. It is of course possible to replace any of the windings 47 by a winding 47' of the type shown in FIGURE 4 and to give the corresponding rotor disc portion end face a single band of slots and teeth of the type shown in FIGURE 5.

Figure 6:
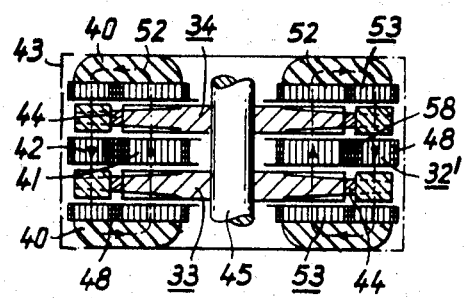
FIGURE 6 is a view similar to that of FIGURE 1 of another embodiment of the present invention.

A modified form of construction of the FIGURE 1 arrangement is shown in FIGURE 6 to include a rotor having disc portions 33 and 34 which are identical with the corresponding disc portion of FIGURE 1. However, the stator of the device of FIGURE 6 differs in several respects from that of FIGURE 1. Firstly, it is provided with only a single, enlarged excitation winding 58 disposed in central disc portion 32', this winding being disposed between the inner ring member and the outer ring member of the central disc portion.

The arrangement of FIGURE 6 also differs in that both the central disc portion 32' and the end disc portions 53 of the stator are constructed of a plurality of sector-shaped coil cores divided into two bands, with the cores of each band having identical cross sections. This arrangement is shown most clearly in FIGURE 7 for the central disc portion 32'. As is shown therein, disc portion 32' is formed of a plurality of sector-shaped coil cores 55 and 56 divided into two bands, with the cores of each band having identical cross sections. The cores of each band are separated from one another by radially-extending separating channels and the two bands are separated from one another by an annular, non-magnetic separating groove 54 in which the homopolar excitation winding 58 is disposed. The number of cores 55 or 56 in each band is made equal to the total number of slots and teeth in each band of the associated end face of its adjacent rotor disc portion.

Each band of cores is wound, along its entire axial dimension, with turns of an A.C. winding 48 whose insulation also functions to magnetically separate the cores from one another. The coils around the cores 55 of the outer band are connected to the coils around the cores 54 of the inner band either in a manner analogous to the arrangement shown in FIGURE 2, as suggested by the manner of connection shown at the right-hand side of FIGURE 7, in which case the associated rotor disc portion end face will have the form shown in FIGURE 3, or in a manner analogous to that illustrated in FIGURE 4, as suggested by the connections shown at the left-hand side of FIGURE 7, in which case the associated rotor disc portion end face will have the form shown in FIGURE 5. The end stator disc portions 53 will be constructed in a similar manner, with the exception that no annular groove will be provided for an excitation winding.

Each of the cores 55 and 56 is made either of a plurality or arcuate laminations, each layer of which is electrically isolated from its adjacent layers, or of a single ferrite body. Each of the end disc portions 53 is again provided with a solid annular body 40 serving as a magnetic return path for the flux, whose flow is indicated by the broken lines 52.

It may be noted that stator end disc portions having the form shown in FIGURE 6 may also be suitably employed in the device of FIGURE 1.

Devices of the type shown in FIGURE 6, as well as those of the type shown in FIGURE 1 and of types to be described below, are preferably constructed so that each inner member of each stator disc portion has the same cross-sectional area, taken in a plane perpendicular to the axis of rotation of the machine, as its associated outer member. This assures that both members will always reach the same degree of saturation, i.e., the same flux density will exist in both, so that each A.C. winding conductor portion carried by the inner member will be subjected to the same average flux density level as each A.C. winding conductor portion carried by the outer member, with the result that a symmetrical voltage will be induced in each A.C. winding.

As has been noted above, devices of the type shown in FIGURES 1 and 6 operate according to the modulation principle, in that, when the rotor is driven in rotation, the teeth and slots of one band of the rotor disc portion end face of a particular air gap system will pass each A.C. winding conductor portion in succession, so that the length of the air gap associated with each conductor portion will undergo a series of alternations. As a result, the density of the flux acting on each conductor portion will undergo a corresponding alternation, thus inducing an alternating voltage therein.

As has also been noted above, the stator partial disc portions are preferably made of laminated bodies formed by coiling a plated sheet metal, preferably steel, strip in a spiral manner. These bodies are preferably plated with a suitable magnetic insulating material which effectively prevents the flow of flux between adjacent laminations. This form of construction presents the advantages of assuring a substantially axial flux flow and of permitting a significant reduction in the amount of material required for each of the disc portions.

Figure 8:
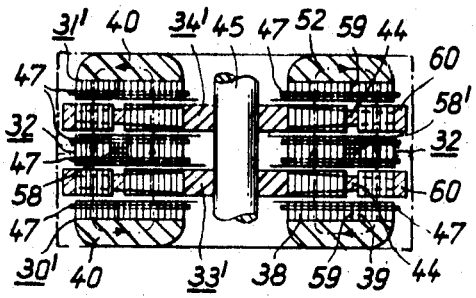
FIGURE 8 is a view similar to that of FIGURE 1 showing a further embodiment of the present invention.

Another modified form of construction of the arrangement of FIGURE 1 is shown in FIGURE 8 and is constituted by a device in which only a single, enlarged homopolar excitation winding is provided and is disposed between the inner and outer ring members of stator central disc portion 32. The inner member 38 and outer member 39 of each of the stator end disc portions 30' and 31' are not separated by an annular space, but only by a cylindrical isolating layer 59 made of non-magnetic material and provided for the purpose of preventing magnetic flux from flowing directly between the two members, the return path for the flux being provided only by the attached annular bodies 40.

The arrangement of FIGURE 8 is also distinguished in that each member of the rotor disc portions 33' and 34' is constituted by a laminated body constructed in a manner similar to that of the stator disc portion member, i.e., by coiling a suitably plated sheet metal strip. In this embodiment, also, the inner member of each rotor disc portion is magnetically isolated from its associated outer member by an annular spacer ring 44 made of a suitable non-magnetic material. In order to give the rotor disc portions an adequate degree of rigidity, each of them is further provided with a shrunk-fitted enclosing ring 60.

FIGURE 9 shows another embodiment according to the present invention which is constructed to produce a particularly effective ventilating action. The stator disc portions 30' and 31' of this embodiment are identical in construction to those of FIGURE 8. However, the stator central disc portion 32" is here composed of a single laminated body and is not provided with any excitation winding. Instead, the excitation windings are now disposed in the rotor disc portions 33" and 34", each of which consists of an inner disc member 61 and an outer ring member 62 separated from disc member 61 by a spacer ring 64. The outer circumference of member 61 is formed with a groove in which a homopolar excitation winding 63 is disposed. Separating ring 64 is primarily provided for the purpose of retaining excitation winding 63 so as to prevent the winding from being adversely affected by centrifugal forces. If desired, ring 64 may be made of a suitable non-magnetic material so that it can also act to suppress any leaking flux which might be produced in the region between members 61 and 62 due to the fact that the teeth and slots of one member are angularly offset with respect to those of the other member.

Each of the stator end disc portions 30' and 31' carries a solid annular body serving as a magnetic return path. In order to provide an efficient ventilating action, the outer end surface of each of these annular bodies is provided with a spiral rib 65 and is covered by a suitable cover plate 67 to form a spiral cooling channel 66 for the flow of a cooling medium.

The outer surface of each cover plate 67 is provided with a plurality of radially extending ribs for the purpose of increasing the heat exchange surface area which it presents to gas flowing thereacross.

A cooling medium flow path for a gaseous medium is formed by axial inlet openings 68 formed in the solid annular body associated with each stator end disc portion, by the outermost machine air gaps 69, by flow channels 70 provided adjacent the outer periphery of each stator end disc portion, and by radial channels 71 defined by the ribs in the outer surfaces of cover plates 67. In the air gaps, the cooling air is automatically accelerated by the rotating slots in rotor disc portions 33" and 34" and by the centrifugal forces created by rotor rotation.

In order to produce a similar ventilating flow through the air gaps 69 associated with stator central disc portion 32", there are also provided substantially axial bores 72 which pass through rotor disc portions 33" and 34" near the rotor shaft.

The machine is also provided with baffle plates 73 disposed adjacent the outer periphery of the machine disc portions for improving the circulation of air through the machine.

The ventilation of the machine may be further improved by providing additional means for cooling the stator central disc portion 32'. These means may consist, for example, of a hollow tube 74 containing a circulating cooling medium and having a plurality of interconnected radial portions passing through the median plane of, and distributed around, stator central disc portion 32". Tube 74 is preferably made of an electrically conductive material and may simultaneously serve as an electrical damper winding.

The channels 72 provided in rotor disc portions 33" and 34" are inclined slightly with respect to the shaft axis, this inclination being away from the axis in the direction of cooling medium flow, and are tapered to have a cross section which decreases progressively in the direction of this flow. Such an inclination has the effect of permitting the centrifugal forces produced by the stator rotation to accelerate the cooling medium flowing through the channels 72. Moreover, the tapering of the channels causes them to act as nozzles which further accelerate the cooling medium.

The device of FIGURE 9 can also be constructed so that the annular bodies constituting magnetic flux return paths are provided with radial bores which extend completely therethrough and which are disposed as close as possible to their associated stator end disc portions. These bores are arranged for receiving a portion of the cooling medium flow and for thus permitting a more effective cooling of these end disc portions.

A further embodiment of the present invention is shown in FIGURE 10. This embodiment is generally similar to that of FIGURE 9 and includes a stator composed of end disc portions 30 and 31 identical with those of FIGURE 1 and central disc portion 32" identical with those of FIGURE 9. The stator disc portions are provided with homopolar excitation windings 35, 36 and 37, respectively, and with A.C. windings 47' wound in the manner shown in FIGURE 4.

The machine rotor is constituted by two disc portions 233 and 234, with each end face of each rotor disc portion being provided with one band of slots and teeth in the manner shown in FIGURE 5, such an arrangement being necessary when the A.C. windings are wound in the manner shown in FIGURE 4.

Each of the stator end disc portions carries a solid annular body 40' which serves as the magnetic return path and which is provided with a plurality of radial bores 75 through which a liquid or gaseous cooling medium may be circulated. These bores are preferably joined together in series to form a continuous circulating path. The bodies 40' differ in form from the bodies 40 of FIGURE 1 in that their outer end faces are rounded off in the manner illustrated, giving each body 40' the form of a semicircular toroid. This form of construction has the advantage of permitting a weight reduction to be realized without substantially reducing the conductance of the magnetic circuit since the modified shape represents a more accurate approximation of the actual magnetic flux return path and since substantially no flux actually penetrates into the outer corners of a body having the form shown in FIGURE 1.

In order to provide for a complete ventilation of the machine of FIGURE 10, flow paths for air, or other gaseous medium enclosed within housing 43, are provided and are constituted by axial openings 68 in bodies 40', passages 72 in rotor disc portions 233 and 234, the machine air gaps themselves, baffles 73, and radial passages formed between housing 43 and the outer, rounded end faces of bodies 40'. The flow of this cooling medium is materially aided by the radial slots in rotor disc portions 233 and 234 and by the centrifugal forces resulting from the rotor rotation.

Stator central disc portion 32" is provided with hollow conductive tubes 74 for the circulation of a cooling medium, these tubes preferably being connected together in series to form a continuous, sinuous flow passage and being made of conductive material to act as electrical damper windings.

All of the specific embodiments of the present invention which have thus far been described include three stator disc portions and two rotor disc portions each disposed between two successive stator disc portions. However, the present invention is not limited to this form of construction and can be applied equally well to the construction of a machine having three rotor disc portions and two interposed stator disc portions. One embodiment constructed in this manner is illustrated in FIGURE 11 and includes a rotor having two end disc portions 154 and 155 and a central disc portion 156, all mounted for rotation on a shaft 45. The machine is further provided with two stator disc portions 157 and 158 rigidly mounted in housing 43 and each carrying a homopolar excitation winding.

Each of the stator disc portions 157 and 158 is structurally identical with the central disc portion 32″ of FIGURE 10 and is provided, at each end face, with an A.C. winding arranged as shown in FIGURE 4.

The central rotor disc portion 156 corresponds in construction to either of the rotor disc portions 233 and 234 of FIGURE 10, with the exception that it is not provided with cooling medium flow passages 72. Each of the rotor disc portions is made from a single mass of material and each end face thereof which is disposed adjacent an air gap in the magnetic flux path is provided with a single band of slots and teeth so as to have the form shown in FIGURE 5. Furthermore, each of the rotor end disc portions 154 and 155 serves as a magnetic flux return path.

The machine shaft 45 is mounted in housing 43 through the intermediary of rotary bearings 76.

The proper positioning of each of the rotor disc portions is achieved in a simple manner by suitably varying the diameter of shaft 45 at the points 77, 78 and 79.

In addition to the generators which have already been described in detail herein, the present invention can also be utilized for the construction of converter sets, i.e., electrical machines having a motor portion and a generator portion. Such machines can have one region in which a homopolar excitation is provided and another region provided with heteropolar excitation, both types of excitation being generated by an annular excitation winding, and can have a wide variety of forms of construction, only the most important of which will be described in detail below.

Figure 12:
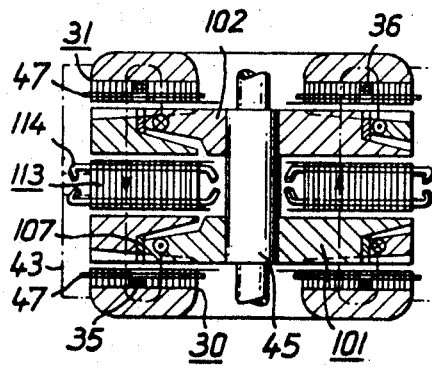
FIGURE 12 is a view similar to that of FIGURE 1, taken through the plane defined by the line 12—12 of FIGURE 14, of another embodiment of the present invention.

One machine of this type is shown in FIGURE 12 to include a central stator disc portion 113 composed of a laminated body, and two rotor disc portions 101 and 102 mounted for rotation with a shaft 45. The side of each rotor disc portion which faces stator disc portion 113 is formed as a set of claw poles, with the two sets of claw poles cooperating with stator disc portion 113 to constitute a synchronous motor. The other side of each rotor disc portion 101 and 102 is formed with two bands of radially extending slots and teeth to have the form shown in FIGURE 3, and cooperates with a respective one of the stator end disc portions 30 and 31 to constitute a synchronous generator.

End disc portions 30 and 31 are identical with those of FIGURE 1 and are provided with identical annular solid bodies which function as magnetic flux return paths. Each of end disc portions 30 and 31 is provided with a respective one of the homopolar excitation windings 35 and 36.

Rotor disc portions 101 and 102 are identical with one another, a bottom perspective view of portion 101 being shown in FIGURE 13 and a top perspective view thereof being shown in FIGURE 14. As may be seen from these figures, the disc portion 101 is made of two parts 103 and 104 which are magnetically separated from one another, this separation being maintained by a spacer ring 107 made of a suitable non-magnetic material. As is shown most clearly in FIGURE 13, the lower side of disc portion 101 is provided with two bands of radially extending teeth 105 and slots 106, with the inner band being disposed on member 103 and the outer band being disposed on member 104, and with the slots and teeth of the outer band being angularly offset with respect to those of the inner band in such a way that each slot of the outer band is disposed opposite a tooth of the inner band, and vice versa. The circular boundary between these two bands is arranged in axial alignment with the homopolar excitation winding 35 disposed in stator end disc portion 30.

FIGURE 14 shows that the other side of disc portion 101 is constructed so that member 103 has two outwardly extending sectors and member 104 has two inwardly extending sectors whose center lines are oriented at right angles to the center lines of the sectors of member 103. These sectors thus constituted four claw poles which function to convert the homopolar excitation produced by windings 35 and 36 into a heteropolar excitation which traverses central stator disc portion 113. In order to facilitate an understanding of the structure of disc portion 101, the plane of FIGURE 12 has been taken along the line 12—12 of FIGURE 14.

As may be seen most clearly from FIGURE 12, each of the disc portions 101 and 102 is arranged so that the side thereof having two bands of slots and teeth faces its associated stator end disc portion and the side thereof having claw poles faces stator central disc portion 113. The homopolar excitation flux generated by excitation windings 35 and 36 thus passes in one axial direction through member 103 of each rotor disc portion and in the other axial direction through member 104 of each rotor disc portion. For example, flux flows from the inner half of stator end disc portion 30 into member 103 of rotor disc portion 101, is then concentrated at the claw poles of member 103, passes through two diametrically opposed quadrants of central disc portion 113 into the corresponding claw poles of member 103 of disc portion 102, and is then redistributed around the other side of member 103 of disc portion 102 and passes into the inner half of end disc portion 31. The flux then circulates back through the outer part of end disc portion 31, into member 104 of rotor disc portion 102, is concentrated at the claw poles of member 104, passes again through central disc portion 113, this time through the other two diametrically opposed quadrants thereof, into the claw poles of member 104 of disc portion 101, and is then redistributed around the other side of member 104 and passes into the outer part of end disc portion 30.

The manner in which the rotor disc portion 101 and 102 convert the homopolar excitation produced by windings 35 and 36 into a heteropolar excitation is illustrated in FIGURES 13 and 14. Referring first to FIGURE 13, it may be seen that flux passes in one axial direction through the disc surface constituting one side of member 103 and in the other axial direction through the ring surface constituting the corresponding other side of member 104, as indicated by the symbols 51. The flux passing into member 103 is concentrated at the claw poles forming an integral part of this member and leaves these claw poles passing in one axial direction, as indicated by the symbols 108 and 110 of FIGURE 14. The flux passing in the other direction enters the claw poles of member 104, as indicated by the symbols 109 and 111. Since the disc portions 101 and 102 are arranged so that the claw poles of member 104 of disc portion 101 are aligned with the claw poles of the corresponding member of disc portion 102, as are the claw poles of the disc member of the two disc portions, the flux leaving the claw poles of member 103 of one disc portion will pass directly to the claw poles of the corresponding member of the other disc portion, and the flux leaving the claw poles of the member 104 of one disc portion will enter the claw poles of the corresponding member of the other disc portion. As a result, the flux field to which central stator portion 113 is subjected will undergo a periodic axial direction reversal around the circumference of disc portion 113. Therefore, as disc portions 101 and 102 rotate, the flux passing through any point in stator central disc portion 113 will undergo periodic axial direction reversal.

The central disc portion 113 is provided with A.C. windings 114 connected to receive the A.C. current required for driving the synchronous motor constituted by the combination of this disc portion and parts of rotor disc portions 101 and 102. Each of the end disc portions 31 and 32 is provided with an A.C. output winding 47 arranged in the manner shown in FIGURE 2. One manner in which the winding 114 can be arranged will be described in detail below in connection with FIGURE 15.

The A.C. winding 114 includes two sets of radial conductors, each of which sets is disposed in radial grooves formed in a respective end face of disc portion 113. Winding 114 is also provided with end connection portions which extend across the outer circumference of portion 113 between the two end faces thereof. All of the end connection portions are arranged at the same angle with respect to the median plane through portion 113, so that the winding 114 makes an efficient utilization of the available space.

FIGURE 15 shows a winding diagram which permits a clear understanding of the precise manner in which the winding 114 can be arranged. Winding 114 here constitutes a three-phase winding and various points thereon are designated with the reference symbols U, V, W, and X, Y, Z in accordance with standard practice for three-phase windings. FIGURE 15 also shows four sector-shaped claw poles 103 and 104 which are formed on each of the rotor disc portions 101 and 102. The directions of axial flux flow created by these claw poles are indicated by conventional symbols.

The radial conductors of winding 114 are preferably arranged so that each conductor on one end face of disc portion 113 is directly connected to a conductor on the other end face thereof which is angularly spaced from the first conductor by a distance equal to one pole pitch of the associated claw poles.

Turning now to FIGURE 16, there is shown one form of construction for an asynchronous-synchronous converter set according to the present invention, this embodiment differing in structure from that of FIGURE 12 only in the form of construction of rotor disc portions 116 and 117. In this embodiment the function of an asynchronous motor is performed by the combination of stator central disc portion 113 and the parts of rotor disc portions 116 and 117 adjacent thereto, whereas the remaining parts of disc portions 116 and 117 cooperate with stator end disc portions 30 and 31 to function as a synchronous generator.

Each of the rotor disc portions 116 and 117 is constituted by a solid disc mounted for rotation on shaft 45 and a spirally-wound laminated unit disposed adjacent stator central disc portion 113. Each rotor disc portion further includes a squirrel cage winding composed of an outer ring 118 and an inner ring 119 surrounding the spiral laminated unit. Rings 118 and 119 are conductively connected together by radially extending conductive rods disposed in grooves or bores formed in the laminated unit. The motor portion of the converter thus functions as an asynchronous motor having a short-circuited rotor.

The return path for the motor flux is provided by the laminated units themselves, while the return path for the homopolar excitation generated by windings 35 and 36 is provided by the solid parts of rotor disc portions 116 and 117. At the end faces adjacent the stator end disc portions, the rotor disc end portions are provided with radially extending slots and teeth having the form shown in FIGURE 5. Correspondingly, the stator end disc portions are provided with A.C. windings 47' having the form shown in FIGURE 4. Alternatively, the rotor disc portions can be provided with two bands of slots and teeth having the form shown in FIGURE 3 and the A.C. windings in the stator end disc portions can have the form shown in FIGURE 2.

Since the motor portion of the machine includes two squirrel cage windings, these windings may be arranged, for example, so that one of them controls the starting of the motor and the other controls the normal running thereof. Alternatively, only one squirrel cage winding need be provided, if desired.

Figure 17:
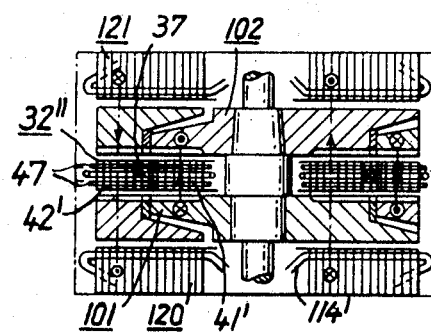
FIGURE 17 is a view similar to that of FIGURE 1 of still another embodiment according to the present invention.

FIGURE 17 illustrates another embodiment of the present invention which is arranged to operate as a synchronous-asynchronous converter set having stator end disc portions 120 and 121 each constituted by a single laminated body. Each of the stator end discs 120 and 121 is provided only with an A.C. winding 114' which is similar to the winding 114 of FIGURE 12 but which has all of its radial conductors disposed in one end face of its associated stator disc. The rotor disc portions 101 and 102 are identical with those of FIGURE 12 but have their positions inverted with respect thereto so that their claw pole sides are disposed adjacent the stator end disc portions and their other sides, which are provided with slots and teeth, are disposed adjacent the central disc portion 32". Disc portion 32" is essentially identical to the central disc portion of the device of FIGURE 10 and is provided with A.C. winding 47 and homopolar excitation winding 37, the latter separating disc portion 32" into an inner ring member and an outer ring member.

Rotor disc portions 101 and 102 are arranged in this manner because parts thereof now cooperate with end disc portions 120 and 121 to perform the motor function, while the generator function is performed by central disc portion 32" and its associated sides of rotor disc portions 101 and 102.

In all of the devices having a motor portion, it is of course necessary that the A.C. winding 114 or 114' be supplied with a suitable A.C. excitation current.

Among the various materials which may be used for the laminated members of the various disc portions of devices according to the present invention, grain-oriented steel may be used to improve the magnetic properties of these elements. Such a material can be used for the construction of any of the laminated bodies through which the magnetic flux passes in only a single direction, the material used having a preferred magnetization direction which coincides with the direction of flow of the magnetic flux. However, for those laminated members in which the flux reverses its axial direction of flow, the flux would be required to move in a direction counter to this preferred magnetization direction, in which case the use of such steel would not be desirable. On the other hand, however, this material may be used in elements in which the magnetic flux only reverses its flow in a radial direction.

It has already been mentioned that laminated members of the various embodiments of the present invention can be fabricated by coiling a sheet metal band or strip. According to another feature of the present invention, it is also possible to produce a member having similar magnetic properties by forming axially extending arcuate slots in the face of a solid body of material. These slots may be formed by the known spark erosion process, which process is particularly well suited for producing such a result since it can be so controlled as to produce slots having a relatively small width and a sufficient depth. The resulting slots can then be filled with a casting resin, for example, in order to give the member a smooth surface.

The specific embodiments of the present invention which have been described herein have been limited to electric motors, generators, and converters, and each embodiment has been described as having some rotary parts and some stationary parts. This manner of description was adopted in order to facilitate an understanding of the basic principles of the present invention. It should be noted, however, that it is immaterial, in applying the teachings of the present invention, which parts rotate and which parts are stationary, if ordinary housing and bearing problems are disregarded. It would also be possible, without departing from the spirit of the present invention, to have both parts rotate, as is also true of prior art rotating machines. For example, both machine parts rotate in electromagnetic slip clutches, which operate in a manner similar to that of electrical machines. It is also possible to apply the teachings of the present invention to the construction of eddy current brakes. It should therefore be understood that the present invention is also intended to cover these types of electric machines.

An eddy brake according to the present invention may be constructed, for example, by providing two central disc portions and three stationary annular members having high magnetic conductivity and mounted with their end faces parallel to the end faces of the rotor disc portions, the stationary members being aligned with the rotor disc portions and being separated from them by air gaps. By inducing eddy currents in the stationary annular members, the rotor will be braked, in a manner which is known in the art.

One type of slip clutch which may also be constructed according to the present invention differs in structure from the above-described eddy current brake in that the stationary annular members are laminated in the manner described above in the case of a generator, and a squirrel cage similar to that described above in connection with asynchronous devices is provided.

Although each of the embodiments described herein is of the type having five disc portions, it should also be appreciated that the present invention can equally well be employed for the construction of machines having seven, nine, or a larger odd number of such disc portions.

It will be understood that the above description of the present invention is susceptible to various modifications, changes, and adaptations, and the same are intended to be comprehended within the meaning and range of equivalents of the appended claims.

What is claimed is:

1. A rotary electric machine comprising, in combination: at least two structurally separate stator disc portions and at least two structurally separate rotor disc portions, the number of stator portions being different from the number of rotor portions and those portions of which there are a greater number including two outer portions each defining one axial end of said machine, said stator portions alternating with said rotor portions along the axis of said machine and adjacent portions being axially spaced from one another to define air gaps each of which extends between one said stator portion and one said rotor portion; at least one of said portions having, on one surface facing an associated air gap, a plurality of angularly spaced, radially extending teeth, the spaces between said teeth defining slots, for producing axial paths of differing magnetic conductance to flux passing through said associated air gap; a circular, homopolar D.C. excitation winding carried by one of said portions concentrically with respect to the machine axis; one said stator disc portion disposed between two rotor portions being divided into an inner disc-shaped member and an outer ring-shaped member, the boundary between said members being aligned with said excitation winding, so that the flux produced by said winding traverses said inner member in one axial direction and said outer member in the opposite axial direction; and an A.C. winding composed of a plurality of radially extending conductors carried on one axial end surface of said one stator portion and extending completely across the air gap adjacent such surface.

2. An arrangement as defined in claim 1 wherein the diameter of said excitation coil is made so that both of said members of said one stator portion will reach the same degree of magnetic saturation when traversed by the axially flowing magnetic flux produced by said excitation winding.

3. An arrangement as defined in claim 1 wherein each of said discs is provided, at each surface adjacent an air gap, with one inner disc-shaped member and one outer ring-shaped member, the boundary between said members being aligned with said excitation winding so that flux produced by said winding traverses said inner member in one axial direction and said outer member in the opposite axial direction.

4. An arrangement as defined in claim 3 wherein said A.C. winding is in the form of a wave or lap winding and said at least one of said portions having a plurality of teeth and slots is constituted by a rotor portion adjacent said one stator disc portion, said teeth and slots being constituted by two concentric annular bands of spaced teeth, the spaces between said teeth of each of said band defining slots and the teeth of one of said bands being angularly offset with respect to the teeth of the other one of said bands in such a manner that each tooth of each of said bands is disposed in radial alignment with a slot of the other of said bands, and with the boundary between said two bands being aligned with said homopolar excitation winding.

5. An arrangement as defined in claim 3 wherein said one stator portion has a plurality of uniformly distributed, radially extending grooves formed therein, each said conductor of said A.C. winding has a first portion which is disposed radially inwardly of said homopolar excitation winding and a second portion which is disposed radially outwardly thereof, each said first portion being disposed in one of said winding grooves and each corresponding second portion being disposed in the next adjacent one of said winding grooves, and said at least one portion having slots and teeth is constituted by a rotor portion adjacent said one stator portion, said slots and teeth being formed in the end face of said rotor portion which faces said one stator portion.

6. An arrangement as defined in claim 3 wherein each of said rotor portions is provided with a non-magnetic separating ring disposed between its said inner and outer members.

7. An arrangement as defined in claim 3 wherein said two outer portions are constituted by stator portions, each said outer portion being composed of at least one annular, spirally laminated member, whose laminations are magnetically separated from one another, said member being disposed at the end face of said stator disc portion which is adjacent a rotor portion, and a solid annular body defining the other end face of said outer portion and forming a magnetic return path for flux passing through said machine.

8. An arrangement as defined in claim 1 wherein said at least one stator portion is provided with a plurality of radially extending separating channels which divide the end face of said rotor portion which is adjacent its associated air gap into two bands of coil cores, with said bands of core coils being separated from each other along a circle aligned with said homopolar excitation winding, the cores of each said band having identical cross sections, and with said A.C. winding having at least one coil wound around each said core.

9. An arrangement as defined in claim 1 wherein said machine is constructed as a converter set having a motor unit and a generator unit and there are three stator disc portions, two of which constitute outer portions, and two rotor portions, there are two homopolar excitation windings, each carried by a respective rotor portion, each said rotor portion is provided, on the surface thereof facing said one stator portion, with a plurality of angularly spaced, radially extending teeth, the spaces between said teeth defining slots, for producing axial paths of differing magnetic conductance to flux passing through the associated air gap, each said rotor portion being formed, at the surface thereof which faces an adjacent outer portion, to present a plurality of claw poles, each of said outer portions is constituted by a spirally laminated body, there are two A.C. windings, each carried by a respective one of said outer portions, and said rotor portions cooperate with said outer portions to constitute a motor while said rotor portions cooperate with said one stator portion to constitute a generator.

10. An arrangement as defined in claim 1 wherein each said outer portion is constituted by a stator portion composed of at least one annular, spirally laminated member whose laminations are magnetically separated from one another, said member being disposed at the end face of said stator portion which is adjacent a rotor portion, and a solid annular body defining the other end face of said stator portion and forming a magnetic return path for flux passing through said machine, said laminated member being of a material having a preferred direction of magnetization and being positioned in the path of flux flowing substantially entirely in said preferred direction.

References Cited

UNITED STATES PATENTS

| | | | |
|---|---|---|---|
| 1,211,617 | 1/1917 | Neuland | 310—164 |
| 2,778,960 | 1/1957 | Anderson | 310—113 |
| 3,109,114 | 10/1963 | Henry-Baudot | 310—268 |
| 3,156,839 | 11/1964 | Wargo | 310—257 |
| 3,169,204 | 2/1965 | Moressee | 310—162 |
| 3,219,861 | 11/1965 | Burr | 310—268 |
| 3,304,598 | 2/1967 | Henry-Baudot | 310—268 |

MILTON O. HIRSHFIELD, Primary Examiner

FRED G. COLLINS, Assistant Examiner

U.S. Cl. X.R.

310—268